July 3, 1956 C. L. HEATER Re. 24,176

RAILWAY BRAKE

Original Filed Sept. 20, 1949 2 Sheets-Sheet 1

INVENTOR.
Charles L. Heater
BY
Wm. O. Garner
Atty

July 3, 1956 C. L. HEATER Re. 24,176

RAILWAY BRAKE

Original Filed Sept. 20, 1949 2 Sheets-Sheet 2

INVENTOR.
Charles L. Heater
BY
Orin O. Bigarner
Atty.

United States Patent Office

Re. 24,176
Reissued July 3, 1956

24,176

RAILWAY BRAKE

Charles L. Heater, Flossmore, Ill., assignor to American Steel Foundries, Chicago, Ill., a corporation of New Jersey Original No. 2,702,608, dated February 22, 1955, Serial No. 116,683, September 20, 1949. Application for reissue November 9, 1955, Serial No. 546,020

4 Claims. (Cl. 188—33)

Matter enclosed in heavy brackets [ ] appears in the original patent but forms no part of this reissue specification; matter printed in italics indicates the additions made by reissue.

This invention relates to brakes and more particularly to an off wheel tread brake for railway car trucks.

A general object of the invention is to devise a brake such as above described wherein means are provided for cleaning the wheel tread surfaces, thereby augmenting rail adhesion, prior to application of the off wheel tread brake means.

A more specific object of the invention is to provide means for frictionally engaging the tread surfaces of the wheels to augment adhesion thereof to the rails prior to actuation of the off tread brake means.

A further object of the invention is to devise a brake arrangement wherein friction means are engaged with the tread surfaces of the wheels and after a predetermined time interval, subsequent to said engagement, the off tread brake means are automatically actuated.

Still another object of the invention is to devise a novel and simple brake system wherein all of the parts are automatically actuated by the compressed air line of the car.

Another object of the invention is to stabilize or rigidify the truck frame with respect to the wheel and axle assemblies before applying the off wheel tread brake, thereby preventing distortion of the normal relationship between these parts, as may occur when off wheel tread brakes are utilized without or simultaneously with wheel tread friction means supported by the truck frame.

The foregoing and other objects and advantages of the invention will become apparent upon consideration of the following specification and the accompanying drawings, wherein.

In each of said figures, certain details may be omitted where more clearly seen in other views.

Figure 3:
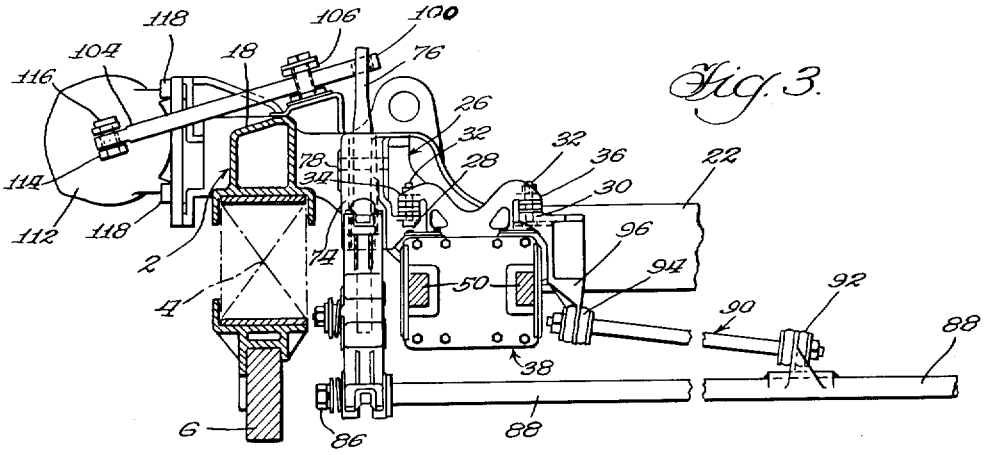
Figure 3 is a sectional view on the line 3—3 of Figure 1.
Figure 4:
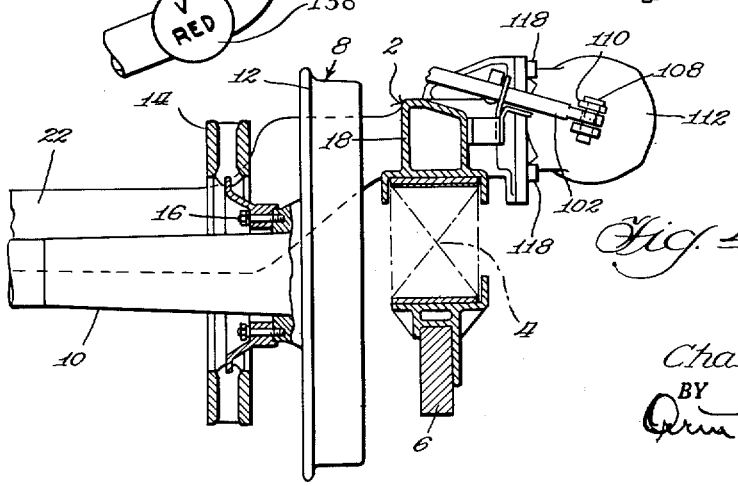
Figure 4 is a sectional view on the line 4—4 of Figure 1.

Describing the invention in detail, the novel brake arrangement is illustrated as applied to a conventional railway passenger car truck having a truck frame structure generally designated 2, spring supported in the usual manner as at 4 (Figures 3 and 4) by an equalizer 6 at each side of the truck, said equalizer having its ends (not shown) supported by wheel and axle assemblies generally designated 8, each comprising an axle 10, a wheel 12 adjacent each end thereof, and a brake disc or rotor 14, bolted as at 16 (Figure 4) to the wheel for rotation therewith.

The truck frame 2 comprises a side rail 18 at each side thereof and end rails 20 at the ends thereof. The side rails 18 are connected intermediate the ends of frame 2 by transoms 22 and are provided at each end of the frame 2 with a pair of depending pedestal legs 24 (Figure 2) adapted to receive a journal box (not shown) of the associated wheel and axle assembly 8.

A brake support casting generally designated 26 is secured in any convenient manner as by welding to each transom 22 adjacent each rotor 14, and the casting 26 is provided with outboard and inboard ledges 28 and 30, removably attached as by bolts 32 to outboard and inboard arms 34 and 36 of a cylinder housing 38.

Figure 1:
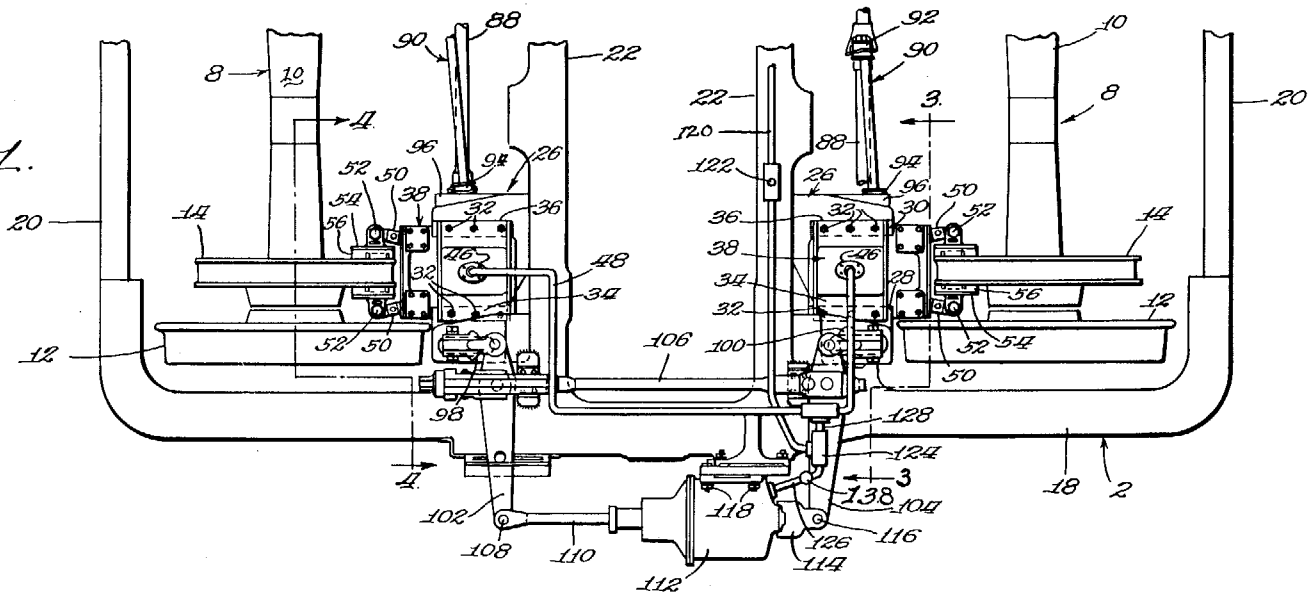
Figure 1 is a fragmentary top plan view of a railway car truck having the novel brake system applied thereto, only one half of the truck being illustrated inasmuch as it is symmetrical about its longitudinal vertical center plane.
Figure 5:
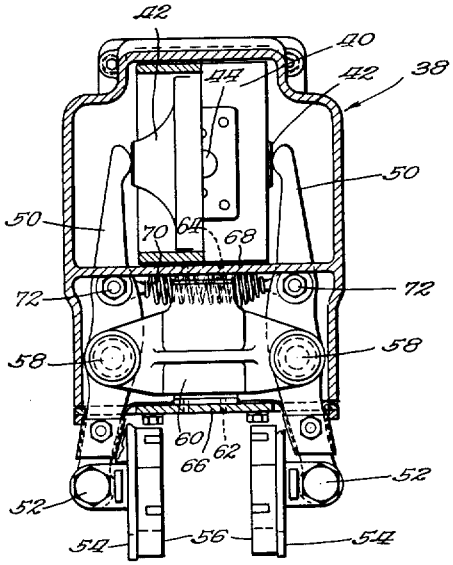
Figure 5 is an enlarged top plan view of one of the off wheel tread brake units, portions thereof being broken away to clarify the illustration.

The cylinder housing 38 is shown in detail in Figure 5 and contains a cylinder 40 having spaced pistons 42. The cylinder is provided with an inlet port 44 between the pistons to convey pressure actuating fluid such as compressed air thereto and the housing 38, as best seen in Figure 1, is provided with a nozzle 46 adapted to afford convenient means for connecting a fluid supply line 48 to the port 44.

Referring again to Figure 5, the housing 38 contains a pair of levers 50 engaged at their inner ends with the pistons 42 and pivoted at their outer ends as at 52 to brake heads 54, carrying brake shoes 56 for engagement with opposite sides of the related rotor 14.

Intermediate their ends, the levers 50 are pivotally fulcrumed as at 58 to a fulcrum block 60 having trunnions 62 and 64 pivotally mounted in complementary openings in cylinder housing walls 66 and 68 respectively, thereby accommodating relative angular movement between the wheel and axle assembly 8 and the frame 2 when the brake shoes 56 are applied to the rotor 14. A tension release spring 70 is connected as at 72 to the levers 50 for returning the latter to release position after actuation of the brake as hereinafter described.

Referring again to Figures 1 to 4, the brake support casting 26 comprises a housing 74 containing a substantially vertical dead truck lever 76 pivotally fulcrumed thereto as at 78, said lever being pivotally connected at its lower extremity as at 80 to a brake head 82 carrying a brake shoe 84 for frictional engagement with the tread surface of the related wheel 12. Each brake head 82 is connected as at 86 to a beam 88 connected to the corresponding brake head at the opposite side of the truck; and lateral movement of the beam 88 and heads 82 is controlled by a unit 90 resiliently connected as at 92 to the beam and resiliently connected as at 94 to a depending lug 96 of the brake support casting 26. It may be noted that the unit 90 per se is no part of the present invention and is fully disclosed and claimed in a copending application Serial No. 81,979, filed March 17, 1949, in the United States Patent Office in the name of Robert B. Cottrell, now Patent No. 2,612,971, issued October 7, 1952.

The dead truck levers 76, at each side of the truck, are afforded universal connections by clevises 98 and 100 (Figure 1) to live and dead cylinder levers 102 and 104 pivotally interconnected intermediate their ends by a pull rod 106. The outboard end of the live lever 102 is pivotally connected as at 108 to a piston rod 110 of a piston (not shown) within a conventional pneumatic cylinder 112, having a bracket 114 affording a fixed pivotal fulcrum as at 116 for the outboard end of the dead cylinder lever 104. The cylinder 112 is removably secured as at 118 to the side rail 18 of the truck frame 2.

As above noted, a pressure line 48 is connected to each nozzle 46 to deliver pneumatic pressure fluid to the associated off wheel tread brake cylinder; and a pneumatic supply line 120 having a fitting 122 for connection to a source (not shown) of compressed air carried by the car body (not shown) is connected by a T-fitting 124 to the line 48 and to a line 126 connected to the brake cylinder 112 for actuation thereof. A choke or throttle fitting 128 is provided at a point downstream of the connection at 124 between the supply line 120 and the delivery line 126 of the cylinder 112.

Figure 6:
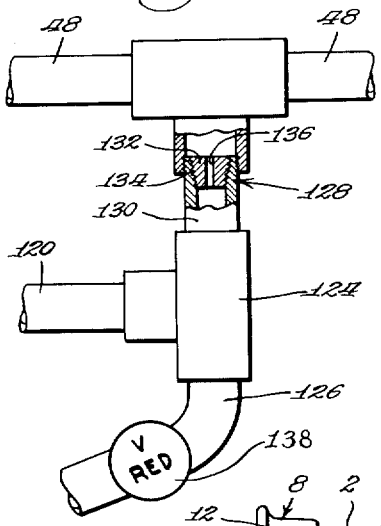
Figure 6 is an enlarged fragmentary, partly broken view of the piping system.

The throttle 128 is diagrammatically illustrated in the enlarged view of Figure 6 as a pipe or tube 130 connected to the fitting 124 and having a plug 132 threaded therein as at 134, said plug having a restricted throttle opening 136 accommodating flow of pneumatic pressure fluid downstream from the fitting 124 to the delivery lines 48 of the respective brake cylinders 40.

It will be understood that the line 120, as shown in Figure 1, is similarly connected at the opposite side of the truck (not shown) to brake parts corresponding to those shown in the drawings.

In operation of the novel brake system above described, compressed air is admitted by an operating valve (not shown) to the fitting 122 and passes through the supply line 120 and the fitting 124 into the delivery line 126 of the cylinder 112, whereupon the piston rod 110 is moved to the left, as seen in Figure 1, rotating the live truck lever in a clockwise direction about its pivotal connection to the rod 106 and rotating the dead cylinder lever 104 in a counter-clockwise direction about its pivot point 116 thereby actuating the truck levers 76 to engage the wheel tread shoes 84 with the tread or rolling surfaces of the wheels 12.

After a predetermined time interval, subsequent to actuation of the shoes 84 and dependent upon the setting of the throttle 128, pressure builds up in the delivery lines 48 of the respective brake cylinders 40 to actuate the levers 50 thereby engaging the brake shoes 56 with the rotors 14 to decelerate the wheel and axle assemblies 8.

If desired, a pressure reducing valve of any conventional design diagrammatically indicated at 138 may be incorporated in line 126 to reduce the pressure in cylinder 112 to any predetermined value sufficient to clean the wheel treads before actuation of the disc brake shoes 56.

According to the present invention, it has been discovered that by applying the shoes 84 to the tread surfaces of the wheels, these surfaces are cleaned thereby increasing the coefficient of friction between the rail and wheels prior to actuation of the off wheel tread brake shoes 56, thereby accommodating application thereof to the rotors 14 at maximum pressure without danger of wheel sliding on the rails, such as might occur if the shoes 56 were applied at maximum pressure prior to cleaning of the wheel tread surfaces by the shoes 84.

Upon release of pressure in the pneumatic supply line 120, the brake levers 50 are released by their springs 70 and the brake beams 88 are released by the resilient connections of the units 90 to the beams and to the transom mounted supports 96.

I have discovered that in conventional prior art arrangements, braking torque transmitted to the frame 2 by the shoes 56 upon application thereof to the rotors 14 has resulted in distortion of the normal relationship between the spring-supported frame 2 and the unsprung equalizers 6 of the truck; and I have also discovered that simultaneous actuation of shoes [55] *56* and shoes 84 under certain circumstances may aggravate this condition inasmuch as the shoes 84 which are rigidly connected to the frame 2 may lock the frame in distorted position until the brakes are released. Accordingly a significant aspect of the present invention is the locking of frame 2 and wheel and axle assemblies 8 in normal position by means of the shoes 84 before braking force is exerted by the shoes 56 against the rotors 14.

Figure 2:
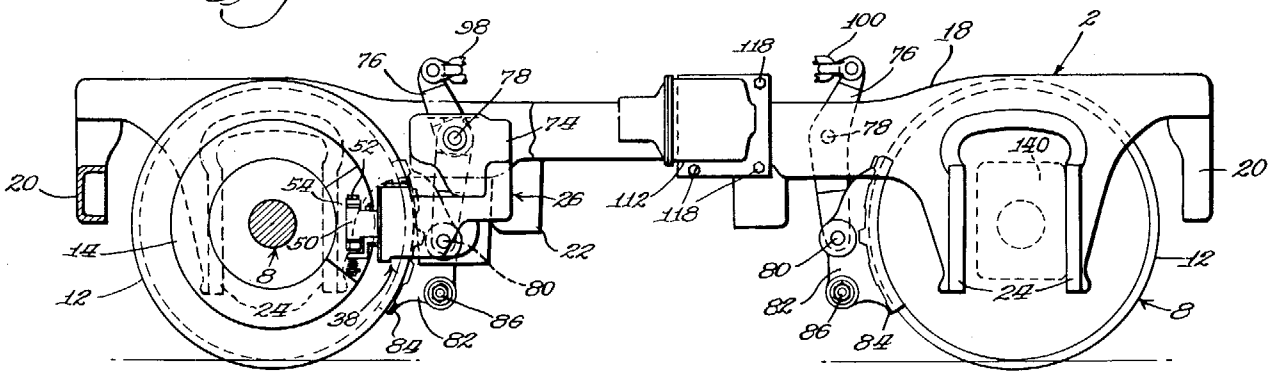
Figure 2 is a composite side view, the right half thereof being a side elevational view and the left half being a sectional view taken at the longitudinal vertical center plane of the truck.

More specifically this action is accomplished by the complementary contours of each brake shoe 84 and the related wheel tread surface as seen in Figure 2. Thus upon actuation of right hand brake shoe 84, the wheel and axle assembly 8 and its journal box 140 are urged to the right as seen in this figure relative to the truck frame 2. This not only restrains longitudinal oscillation as well as lateral oscillation of truck frame 2 relative to the wheel and axle assembly 8 but positively locks the truck frame 2 against the vertical oscillation due to the complementary contour of shoe 84 and the engaged wheel tread surface. Actuation of the left hand shoe 84 similarly stabilizes that end of truck frame 2. Under these conditions, the rotors 14 and brake shoes 56 are stabilized relative to each other so that the brake shoes 56 are in proper alignment with respect to the related rotors 14.

I claim:

*1.* In a brake arrangement for a railway car truck having a frame spring-supported from a wheel and axle assembly with a journal box received between spaced pedestals of said frame; the combination of a brake disc on said assembly having approximately radial brake surfaces at opposite sides thereof, each of said surfaces being generally annular in form, brake shoes carried by said truck frame for engagement respectively with said surfaces, a power cylinder device operatively connected to said shoes for actuation thereof, a wheel tread brake shoe at one side only of said assembly, said wheel tread brake shoe having an arcuate surface approximately complementary to a wheel tread surface of said assembly and engageable therewith to clean said wheel tread surface and to stabilize the position of said brake surfaces relative to said first-mentioned shoes by clamping the box against one of said pedestals whereby said assembly is clamped between said arcuate surface and said pedestal, another power cylinder device operatively connected to said wheel tread brake shoe for actuating said wheel tread brake shoe, a common supply line having a connection to each of said devices for delivering pneumatic pressure fluid thereto, and a throttle in the connection between said line and said first mentioned device, whereby upon delivery of pneumatic pressure fluid to said line the wheel tread shoe is actuated to clean said wheel tread surface and to stabilize said disc surfaces relative to said first mentioned shoes prior to development of pneumatic actuating pressure in the first mentioned device.

*2. In a composite brake arrangement for a railway car truck, a truck frame resiliently supported on a wheel and axle assembly, a rotor secured on said assembly, a wheel brake rigging carried by said frame and including a single brake shoe to frictionally engage a tread surface of a wheel of said assembly, an off wheel brake rigging carried by said frame and including stators to frictionally engage parallel brake surfaces on said rotor, said surfaces being approximately radial to the rotational axis of said assembly, power cylinder means associated with said wheel brake rigging to move said brake shoe into frictional engagement with said wheel tread surface at a relatively low braking force sufficient to clean said tread surface, and other power cylinder means to move said stators into frictional engagement with respective rotor brake surfaces at a relatively high braking force to decelerate said assembly, and a common source of compressed air connected to both of said cylinder means for delivering compressed air thereto for actuation thereof.*

*3. In a composite brake arrangement for a railway car truck, a truck frame resiliently supported on a wheel and axle assembly, a rotor secured on said assembly, a wheel brake rigging carried by said frame and including a brake shoe to frictionally engage a tread surface of a wheel of*

*said assembly, an off wheel brake rigging carried by said frame and including a stator to frictionally engage a brake surface on said rotor, means associated with said brake riggings operable to first move said brake shoe into frictional engagement with said wheel tread surface by the application of a relatively low braking force sufficient to clean said tread surface, said means being operable thereafter to move said stator into frictional engagement with said rotor brake surface by the application of a relatively high braking force to decelerate said assembly, said means comprises primary and secondary power cylinder devices operatively connected to the brake shoe and stator, respectively, a common supply line leading to each of said devices for delivering pressure fluid thereto, means interposed in said supply line to reduce the pressure of the fluid supplied to said primary power cylinder device, and other means interposed in said supply line to delay the actuation of said secondary power cylinder device for a predetermined interval of time following the actuation of said primary cylinder device.*

*4. In composite brake arrangement for a railway car truck having a truck frame supported by a wheel and axle assembly which includes a wheel and an axle; the combination of a single brake shoe engageable with the tread*

*surface of the wheel, power cylinder means operatively associated with said shoe for actuation thereof, a rotor rotatable with said assembly, other brake shoes engageable with approximately parallel surfaces of the rotor, and another power cylinder means operatively associated with said other brake shoes for actuating said other brake shoes for engaging said other brake shoes with the rotor surfaces at a pressure value substantially greater than that at which the first-mentioned shoe engages the wheel tread surface, and a common source of compressed air connected to both of said power cylinder means for delivering compressed air thereto for actuation thereof.*

References Cited in the file of this patent or the original patent

UNITED STATES PATENTS

| | | |
|---|---|---|
| 1,784,547 | Schmidt et al. | Dec. 9, 1930 |
| 2,269,054 | Fitch | Jan. 6, 1942 |
| 2,295,244 | Tack | Sept. 8, 1942 |
| 2,352,222 | Pogue et al. | June 27, 1944 |
| 2,386,907 | Pierce | Oct. 16, 1945 |
| 2,479,232 | Gunderson | Aug. 16, 1949 |